(12) United States Patent  
Bunderson et al.

(10) Patent No.: US 11,052,943 B2  
(45) Date of Patent: Jul. 6, 2021

(54) SYSTEM AND METHOD FOR CONTROLLING A VEHICLE

(71) Applicants: CNH Industrial America LLC, New Holland, PA (US); Autonomous Solutions, Inc., Mendon, UT (US)

(72) Inventors: Nathan Eric Bunderson, Providence, UT (US); John Arthur Mitsuru Petersen, Providence, UT (US); Brian Robert Ray, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/184,824

(22) Filed: Nov. 8, 2018

(65) Prior Publication Data

US 2019/0077456 A1 Mar. 14, 2019

Related U.S. Application Data

(63) Continuation of application No. 15/098,131, filed on Apr. 13, 2016, now Pat. No. 10,144,453.

(51) Int. Cl.
*B62D 15/02* (2006.01)
*G01C 21/00* (2006.01)
(Continued)

(52) U.S. Cl.
CPC .......... *B62D 15/025* (2013.01); *B60W 30/10* (2013.01); *G01C 21/00* (2013.01); *G05D 1/0217* (2013.01); *G05D 2201/0201* (2013.01)

(58) Field of Classification Search
USPC ........................................................ 701/41
See application file for complete search history.

(56) References Cited

U.S. PATENT DOCUMENTS

| 5,610,815 A | 3/1997 | Gudat et al. |
| 6,377,889 B1 | 4/2002 | Soest |
(Continued)

FOREIGN PATENT DOCUMENTS

| EP | 2871107 A1 | 5/2015 |
| WO | 2006027533 A1 | 3/2006 |
(Continued)

OTHER PUBLICATIONS

Shin, Dong Hun, "Path Generation for Robot Vehicles Using Composite Clothoid Segments," The Robotics Institute Carnegie-Mellon University, Dec. 1990, CMU-RI-TR-90-31, Carnegie-Mellon University, Pittsburgh, USA, 40 pages.

(Continued)

*Primary Examiner* — Tyler D Paige  
(74) *Attorney, Agent, or Firm* — Rebecca L. Henkel; Rickard K. DeMille

(57) ABSTRACT

A control system is configured to receive a first signal indicative of a current position of a vehicle and a second signal indicative of a desired path for the vehicle. The control system is configured to calculate a virtual path between the current position and a target position on the desired path and to output a third signal indicative of curvature command corresponding to an initial curvature of the virtual path to cause a steering control system of the vehicle to adjust a steering angle of the vehicle. The control is also configured to iteratively receive an updated current position, receive any updates to the desired path, calculate an updated target position, calculate an updated virtual path based on the updated current position and updated desired path, and output an updated curvature command corresponding to a respective initial curvature of the updated virtual path as the vehicle travels across a surface.

20 Claims, 6 Drawing Sheets

(51) Int. Cl.
*B60W 30/10* (2006.01)
*G05D 1/02* (2020.01)

(56) References Cited

U.S. PATENT DOCUMENTS

| | | | |
|---|---|---|---|
| 6,711,480 | B2 | 3/2004 | Yamamoto et al. |
| 6,751,547 | B2 | 6/2004 | Khosla |
| 7,010,425 | B2 | 3/2006 | Gray et al. |
| 7,383,114 | B1 | 6/2008 | Lange et al. |
| 7,747,370 | B2 | 6/2010 | Dix |
| 8,131,432 | B2 | 3/2012 | Senneff et al. |
| 8,428,820 | B2 | 4/2013 | Ottenhues et al. |
| 8,762,046 | B2 | 6/2014 | Dorum et al. |
| 8,930,058 | B1 | 1/2015 | Quist et al. |
| 9,020,757 | B2 | 4/2015 | Peake et al. |
| 9,746,854 | B2 | 8/2017 | Berkemeier |
| 9,826,673 | B1* | 11/2017 | Ray ............... G05D 1/0088 |
| 10,143,126 | B2* | 12/2018 | Foster ............ G05D 1/0276 |
| 10,144,453 | B2* | 12/2018 | Bunderson ...... G05D 1/0217 |
| 10,251,329 | B2* | 4/2019 | Foster ............ G05D 1/0219 |
| 2005/0273253 | A1* | 12/2005 | Diekhans ........ G01C 21/20 701/50 |
| 2006/0265122 | A1 | 11/2006 | Chang et al. |
| 2007/0088469 | A1* | 4/2007 | Schmiedel ...... G05D 1/0274 701/23 |
| 2008/0091348 | A1 | 4/2008 | Choi |
| 2008/0255728 | A1 | 10/2008 | Ottenhues et al. |
| 2012/0169504 | A1 | 7/2012 | Hillger et al. |
| 2013/0041549 | A1 | 2/2013 | Reeve et al. |
| 2015/0024354 | A1* | 1/2015 | Neu ............... G09B 9/05 434/225 |
| 2015/0302305 | A1 | 10/2015 | Rupp et al. |
| 2016/0152237 | A1* | 6/2016 | Takahashi ....... B62D 5/0463 701/41 |
| 2016/0313735 | A1 | 10/2016 | Berkemeier |
| 2017/0297621 | A1* | 10/2017 | Bunderson ...... B60W 30/10 |
| 2017/0354078 | A1* | 12/2017 | Foster ............ A01B 69/008 |
| 2017/0354079 | A1* | 12/2017 | Foster ............ A01B 69/008 |
| 2019/0077456 | A1* | 3/2019 | Bunderson ...... G01C 21/00 |

FOREIGN PATENT DOCUMENTS

| | | |
|---|---|---|
| WO | 2010045350 A1 | 4/2010 |
| WO | 2012141601 A2 | 10/2012 |

OTHER PUBLICATIONS

Knowles, David, "Real Time Continuous Curvature Path Planner for an Autonomous Vehicle in an Urban Environment," California Institute of Technology, Sep. 20, 2006, 14 pages.

Ferguson, David, "Path Generation and Control for End of Row Turning in an Orchard Environment," Carnegie-Mellon Robotics Institute Master Thesis, Aug. 16, 2010, 34 pages.

Meidenbauer, Kenneth R., "An Investigation of the Clothoid Steering Model for Autonomous Vehicles," Thesis, Virginia Polytechnic Institute and State University, Jul. 30, 2007, Blacksburg, USA, 86 pages.

PCT International Search Report & Written Opinion for PCT Application No. PCT/US2017/026985 dated Jul. 14, 2017, 15 pgs.

Lekkas, Anastasios M., "Guidance and Path-Planning Systems for Autonomous Vehicles," Thesis for the degree of philosophiae doctor, Apr. 2014, pp. 39-67, Doctoral theses at NTNU, 2014:126, Norwegian University of Science and Technology, Skipnes Kommunikasjon AS, Trondheim, NO, 220 pgs.

* cited by examiner

SYSTEM AND METHOD FOR CONTROLLING A VEHICLE

CROSS-REFERENCE TO RELATED APPLICATION

The present application is a continuation of U.S. application Ser. No. 15/098,131, entitled "SYSTEM AND METHOD FOR CONTROLLING A VEHICLE", filed Apr. 13, 2016, which is hereby incorporated by reference in its entirety.

BACKGROUND

CNH Industrial America LLC and Autonomous Solutions, Inc. collaborated to develop the claimed invention.

The disclosure relates generally to vehicle guidance systems, and more particularly to systems and methods for generating steering commands to guide a vehicle toward and/or along a desired path.

Vehicles, such as automobiles, off-road vehicles, agricultural tractors, or self-propelled agricultural implements, may be used in a variety of tasks (e.g., to transport people or goods from one location to another, to tow agricultural implements, to harvest, plow, cultivate, spray, etc.). Traditionally, vehicles are manually operated by an operator. That is, the steering and speed of a vehicle are controlled by an operator driving the vehicle. Unfortunately, the operator may not drive the vehicle along an efficient path from one location to another location.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a control system is configured to receive a first signal indicative of a current position of a vehicle and a second signal indicative of a desired path for the vehicle. The control system is configured to calculate a virtual path between the current position and a target position on the desired path and to output a third signal indicative of a curvature command corresponding to an initial curvature of the virtual path to cause a steering control system of the vehicle to adjust a steering angle of the vehicle. The control system is also configured to iteratively receive an updated current position, receive any updates to the desired path, calculate an updated target position on the desired path, calculate an updated virtual path based on the updated current position and the updated target position, and output an updated curvature command corresponding to a respective initial curvature of the updated virtual path as the vehicle travels across a surface.

In one embodiment, a non-transitory computer-readable medium has computer executable code stored thereon, and the code includes instructions to receive a first signal indicative of a current position of a vehicle, calculate a virtual path between the current position and a target position on a desired path for the vehicle, and output a third signal indicative of a curvature command corresponding to an initial curvature of the virtual path to adjust a steering angle of the vehicle. The code also includes instructions to iteratively calculate virtual paths between respective updated current positions and target positions on the updated desired path, and output updated curvature command corresponding to a respective initial curvature of the iteratively calculated virtual paths as the vehicle travels across a surface to guide the vehicle toward and/or along the desired path.

A method of controlling a vehicle, includes using a processor for receiving a first signal indicative of a current position of a vehicle, receiving a second signal indicative of a desired path for the vehicle, calculating a virtual path between the current position and a target position on the desired path, and outputting a third signal indicative of a curvature command corresponding to an initial curvature of the virtual path to cause a steering control system of the vehicle to adjust a steering angle of the vehicle. The method also includes using the processor for iteratively calculating virtual paths between respective updated current positions and target positions on the updated desired path, and outputting updated curvature commands corresponding to a respective initial curvature of the iteratively calculated virtual paths as the vehicle travels across a surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
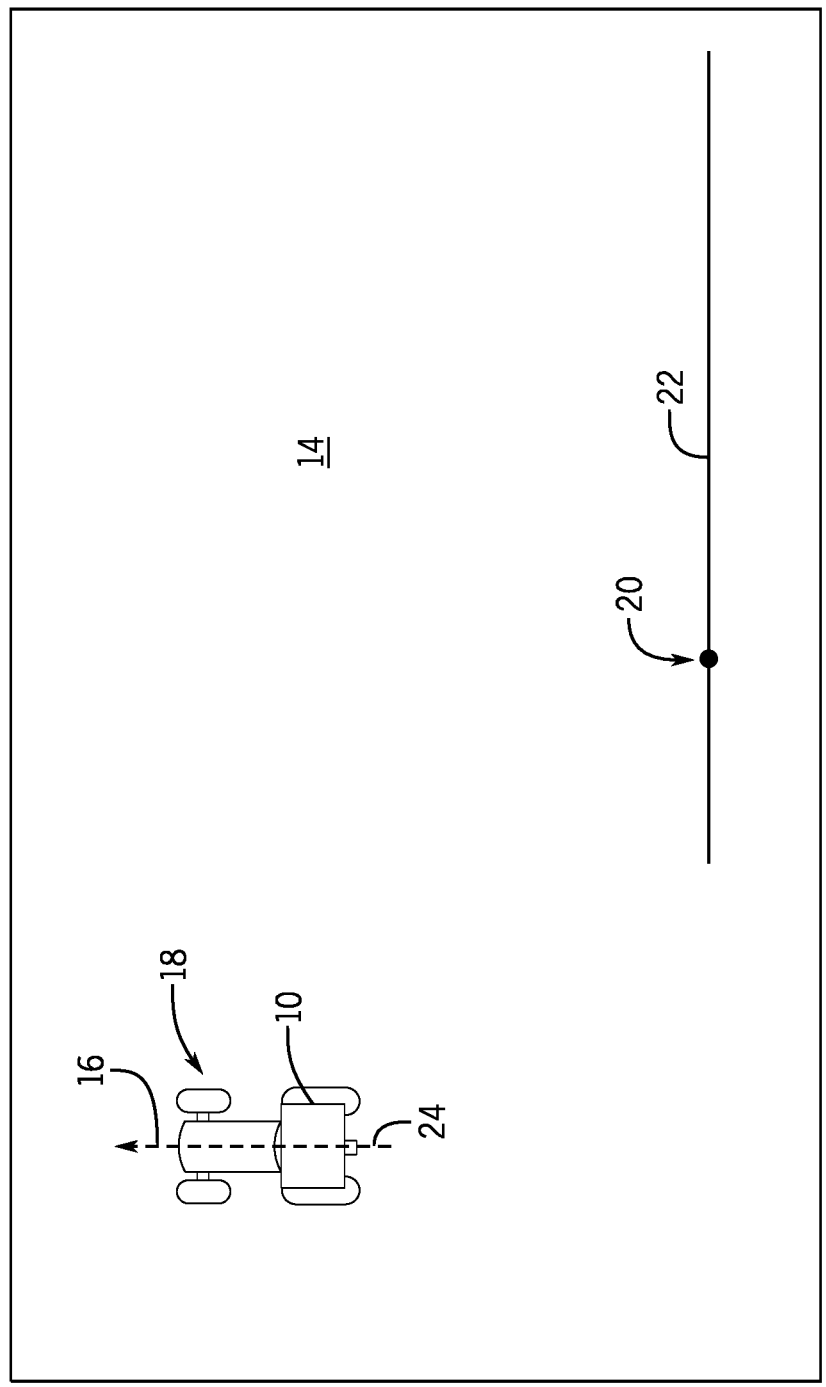
FIG. 1 is a schematic diagram of an embodiment of a vehicle configured to travel across a surface.

Certain examples discussed below relate to off-road vehicles to facilitate discussion. However, it should be understood that the disclosed techniques may be utilized with any of a variety of vehicles, including automobiles. With the foregoing in mind, FIG. 1 is a schematic diagram of an embodiment of a vehicle 10 (e.g., an autonomous vehicle or by-wire vehicle) configured to travel over a surface 14 (e.g., agricultural field, ground, road, or other surface). In the illustrated embodiment, the vehicle 10 is an off-road vehicle (e.g., tractor, self-propelled agricultural implement, or other prime mover). In certain embodiments, an agricultural implement (e.g., a soil conditioner, a tillage implement, a fertilizer application implement, a planter, a seeder, etc.) may be towed by the vehicle 10 to carry out agricultural operations. In some embodiments, the agricultural implement may be integrated within the vehicle 10. For example, the vehicle 10 may be a self-propelled agricultural implement, such as a sprayer, or the like.

In certain embodiments, the vehicle 10 is configured to move over the surface 14 in a direction of travel 16. The vehicle 10 may be configured to move from a current position 18 to a desired path 22. In some embodiments, the current position 18 may be defined by coordinates, $x_0$ and $y_0$, and a current heading, $g_0$. During operation, in some embodiments, the operator may input or select the desired path 22 (e.g., via an operator interface coupled to a control system), and the control system (e.g., within the vehicle 10 or communicatively coupled to the vehicle 10) may be configured to generate (e.g., plan, create, or calculate) virtual paths that may be used to guide (e.g., direct) the vehicle 10 from the current position 18 to the desired path 22. In particular, the control system is configured to iteratively calculate multiple virtual paths as the vehicle 10 moves from the current position 18 toward the desired path 22, and the iteratively calculated virtual paths may be used to guide the vehicle 10 from the current position 18 to the desired path 22. Although illustrated examples show the vehicle 10 acquiring the desired path 22, it should be understood that the disclosed techniques may additionally or alternatively be utilized to track and to guide the off-road vehicle along the desired path 22.

To calculate the virtual paths, in some embodiments, the control system may be configured to determine a target position 20 (e.g., defined by coordinates, $x_t$ and $y_t$, and/or the target heading, $q_t$) located on the desired path 22. The target position 20 may be calculated based at least in part on the desired path 22, the current position 18, and/or characteristics of the vehicle 10 (e.g., current speed, turning radius limits, steering angle limits, steering angle rate limits, steering angle, roll, pitch, rotational rates, acceleration, or any combination thereof). A virtual path may then be calculated between the current position 18 and the target position 20.

As discussed in more detail below, in certain embodiments, the current position 18, the target position 20, and/or the virtual path may be iteratively updated or calculated as the vehicle 10 travels across the surface 14 toward the desired path 22. Thus, the vehicle 10 is not driven along a single virtual path from the current position 18 to the target position 20, but rather the control system may be configured to update the target position 20 (e.g., to calculate an updated target position) to account for changes in the current position 18 and/or changes in the characteristics or the state of the vehicle 10 (e.g., changes in speed or the like) as the vehicle 10 travels across the surface 14. The control system may iteratively calculate virtual paths to account for changes in the current position 18 and/or changes in the target position 20 as the vehicle 10 travels across the surface 14.

In certain embodiments, the control system is configured to control the vehicle 10 (e.g., via controlling the steering angle and/or the speed of the vehicle 10) based at least in part on the iteratively calculated virtual paths to cause the vehicle 10 to move from the current position 18 to the desired path 22. For example, in some embodiments, the control system is configured to output a signal (e.g., to a steering control system) indicative of an initial curvature (e.g., a curvature command corresponding to a first value of the curvature) of each of the virtual paths to adjust a steering angle of the vehicle 10 and to move the vehicle 10 from the current position 18 toward the desired path 22. For example, the control system may calculate a first virtual path between the current position 18 and the target position 20 at a first time and output a signal indicative of the initial curvature of the first virtual path to the steering control system (e.g., to adjust a steering angle of the vehicle 10) to guide the vehicle 10 according to the initial curvature of the first virtual path. Subsequently, the control system may calculate a second virtual path between the current position 18 (e.g., updated or new current position) and the target position 20 (e.g., updated or new target position) at a second time and output a signal indicative of the initial curvature of the second virtual path to the steering control system (e.g., to adjust a steering angle of the vehicle 10) to guide the vehicle 10 according to the initial curvature of the second virtual path. The control system may iteratively calculate virtual paths and guide the vehicle 10 in this manner until the desired path 22 is acquired (e.g., a central axis 24 of the vehicle 10 is aligned with the desired path 22). As noted above, the control system may iteratively calculate virtual paths and guide the vehicle 10 in this manner after the desired path 22 is acquired (i.e., to track or to move along the desired path 22).

As discussed in more detail below, in some embodiments, the virtual paths may be continuous to the second derivative of position ("C2 continuous"). For example, the virtual paths may be a single clothoid segment. Clothoids are curves with a curvature that changes linearly along a length of the curve. Thus, a rate of curvature σ for a given clothoid is constant. Furthermore, in some embodiments, the parameters of the clothoids may be adjusted and/or constrained based on characteristics of the vehicle 10, such as minimum turning radius and maximum turning rate of the vehicle 10. The disclosed systems and methods may efficiently move the vehicle 10 between the current position 18 and the desired path 22 and/or along the desired path 22.

Figure 2:
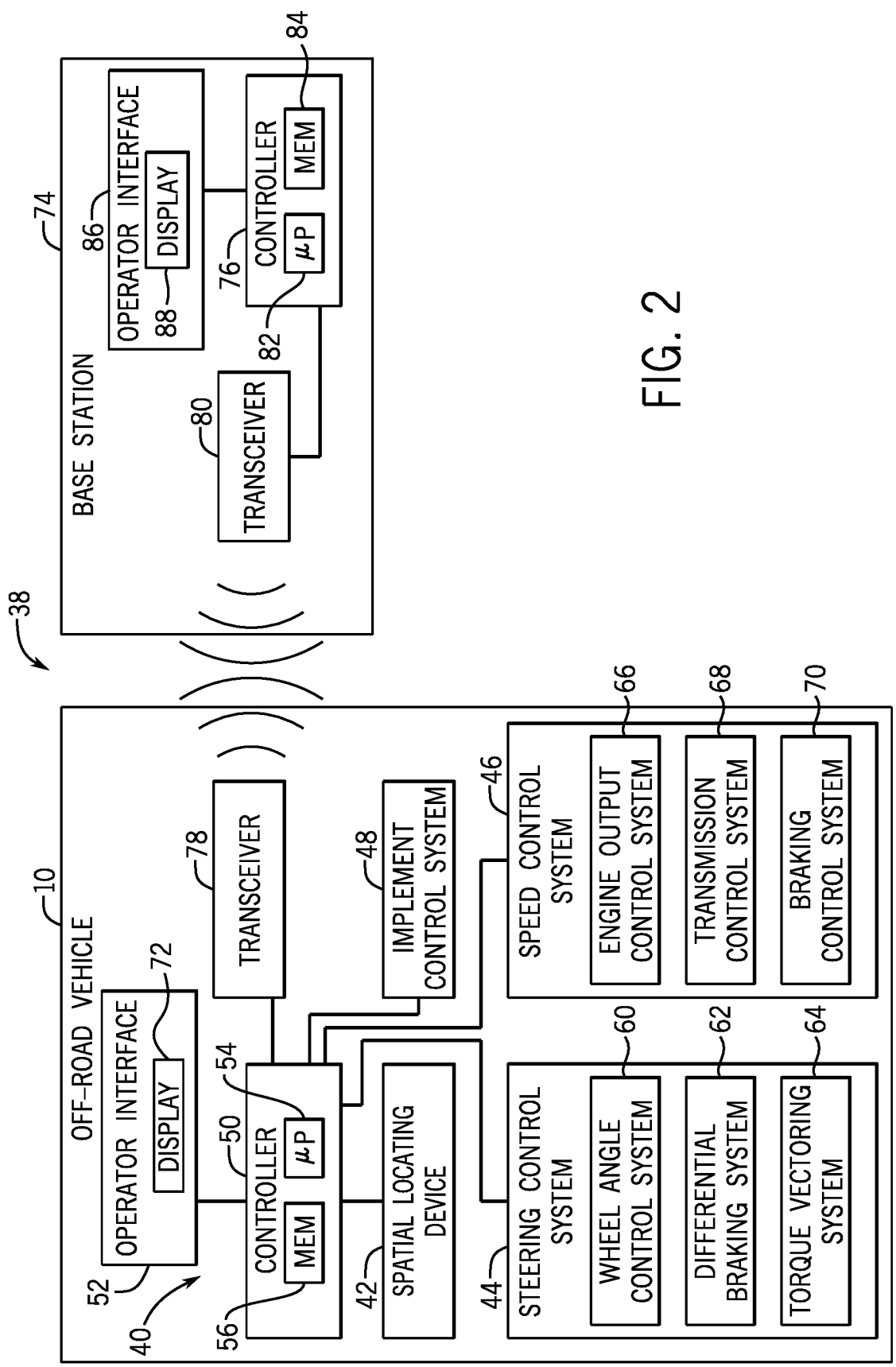
FIG. 2 is a schematic diagram of an embodiment of a control system that may be utilized to control the vehicle of FIG. 1.

FIG. 2 is a schematic diagram of an embodiment of a control system 38 that may be utilized to iteratively calculate virtual paths and/or to control the vehicle 10. In the illustrated embodiment, the control system 38 includes a vehicle control system 40 (e.g., mounted on the vehicle 10). In the illustrated embodiment, the vehicle 10 includes a spatial locating device 42, which is mounted to the vehicle 10 and is configured to determine a position (e.g., the current position 18) of the vehicle 10. The spatial locating device 42 may also be configured to determine a heading (e.g., the current heading, $q_0$) and/or a speed of the vehicle 10, for example. As will be appreciated, the spatial locating device 42 may include any suitable system configured to determine the position and/or other characteristics of the vehicle 10, such as a global positioning system (GPS) or global navigation satellite system (GNSS), for example. In certain embodiments, the spatial locating device 42 may be configured to determine the position and/or other characteristics of the vehicle 10 relative to a fixed point within the field (e.g., via a fixed radio transceiver). Accordingly, the spatial locating device 42 may be configured to determine the position of the vehicle 10 relative to a fixed global coordinate system (e.g., via the GPS or GNSS) or a fixed local coordinate system.

In the illustrated embodiment, the vehicle 10 includes a steering control system 44 configured to control a direction of movement of the vehicle 10, and a speed control system 46 configured to control a speed of the vehicle 10. In addition, the vehicle 10 may include an implement control system 48 configured to control operation of an implement (e.g., towed by the vehicle 10 or integrated within the vehicle 10). Furthermore, the control system 40 includes a controller 50 communicatively coupled to the spatial locating device 42, to the steering control system 44, to the speed control system 46, and to the implement control system 48.

In certain embodiments, the controller 50 is configured to receive a first signal indicative of a position (e.g., the current position 18) of the vehicle 10 (e.g., from the spatial locating device 42) and to receive a second signal indicative of the desired path 22 (e.g., input by the operator via an operator interface 52). In some embodiments, the controller 50 may receive additional signals indicative of characteristics of the vehicle 10 (e.g., (e.g., current speed, turning radius limits, steering angle limits, steering angle rate limits, steering angle, roll, pitch, rotational rates, acceleration, or any combination thereof). In certain embodiments, the controller 50 may be configured to calculate the target position 20 along the desired path 22. As discussed below, the controller 50 may be configured to calculate a virtual path between the current position 18 and the target position 20, and to output a third signal indicative of an initial curvature of the virtual path. The third signal may be provided to the steering control system 44, which is configured to adjust the steering angle of the vehicle 10 based on the initial curvature to guide the vehicle 10 toward the desired path 22. The controller 50 may iteratively calculate the target position 20 and/or the virtual paths and adjust the steering angle based on the respective initial curvature of each virtual path as the vehicle 10 moves toward the desired path 22. In some embodiments, the controller 50 may iteratively calculate virtual paths at intervals less than or equal to approximately 0.01, 0.02, 0.03, 0.04, 0.05, or 0.1 seconds.

In certain embodiments, the controller 50 is an electronic controller having electrical circuitry configured to process data from the spatial locating device 42, among other components of the vehicle 10. In the illustrated embodiment, the controller 50 includes a processor, such as the illustrated microprocessor 54, and a memory device 56. The controller 50 may also include one or more storage devices and/or other suitable components. The processor 54 may be used to execute software, such as software for calculating the target position 20, iteratively calculating virtual paths, controlling the vehicle 10, and so forth. Moreover, the processor 54 may include multiple microprocessors, one or more "general-purpose" microprocessors, one or more special-purpose microprocessors, and/or one or more application specific integrated circuits (ASICS), or some combination thereof. For example, the processor 54 may include one or more reduced instruction set (RISC) processors.

The memory device 56 may include a volatile memory, such as random access memory (RAM), and/or a nonvolatile memory, such as ROM. The memory device 56 may store a variety of information and may be used for various purposes. For example, the memory device 56 may store processor-executable instructions (e.g., firmware or software) for the processor 54 to execute, such as instructions for calculating the target position 20, iteratively calculating virtual paths, and/or controlling the vehicle 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., field maps, maps of desired paths, vehicle characteristics, etc.), instructions (e.g., software or firmware for calculating the target position 20, iteratively calculating virtual paths, controlling the off-road vehicle, etc.), and any other suitable data.

As shown, the steering control system 44 includes a wheel angle control system 60, a differential braking system 62, and a torque vectoring system 64 that may be used to steer (e.g., adjust the steering angle) the vehicle 10, in accordance with the disclosed embodiments. The wheel angle control system 60 may automatically rotate one or more wheels or tracks of the vehicle 10 (e.g., via hydraulic actuators) to steer the vehicle 10 based at least in part on the initial curvature of the virtual path. By way of example, the wheel angle control system 60 may rotate front wheels/tracks, rear wheels/tracks, and/or intermediate wheels/tracks of the vehicle 10, either individually or in groups. The differential braking system 62 may independently vary the braking force on each lateral side of the vehicle 10 to direct the vehicle 10. Similarly, the torque vectoring system 64 may differentially apply torque from the engine to wheels and/or tracks on each lateral side of the vehicle 10. While the illustrated steering control system 44 includes the wheel angle control system 60, the differential braking system 62, and the torque vectoring system 64, it should be appreciated that alternative embodiments may include one or two of these systems, in any suitable combination. Further embodiments may include a steering control system 44 having other and/or additional systems to facilitate directing the vehicle 10 based at least in part on respective initial curvatures of the iteratively calculated virtual paths (e.g., an articulated steering system, differential drive system, etc.), for example.

In the illustrated embodiment, the speed control system 46 includes an engine output control system 66, a transmission control system 68, and a braking control system 70. The engine output control system 66 is configured to vary the output of the engine to control the speed of the vehicle 10. For example, the engine output control system 66 may vary a throttle setting of the engine, a fuel/air mixture of the engine, a timing of the engine, and/or other suitable engine parameters to control engine output. In addition, the transmission control system 68 may adjust gear selection within a transmission to control the speed of the vehicle 10. Furthermore, the braking control system 70 may adjust braking force, thereby controlling the speed of the vehicle 10. While the illustrated speed control system 46 includes the engine output control system 66, the transmission control system 68, and the braking control system 70, it should be appreciated that alternative embodiments may include one or two of these systems, in any suitable combination.

Further embodiments may include a speed control system 46 having other and/or additional systems to facilitate adjusting the speed of the vehicle 10.

The implement control system 48 is configured to control various parameters of the agricultural implement towed by or integrated within the vehicle 10. For example, in certain embodiments, the implement control system 48 may be configured to instruct an implement controller (e.g., via a communication link, such as a CAN bus or ISOBUS) to adjust a penetration depth of at least one ground engaging tool of the agricultural implement, which may reduce the draft load on the vehicle 10. Furthermore, the implement control system 48 may instruct the implement controller to transition the agricultural implement between a working position and a transport portion, to adjust a flow rate of product from the agricultural implement, or to adjust a position of a header of the agricultural implement (e.g., a harvester, etc.), among other operations.

In the illustrated embodiment, the operator interface 52 may be communicatively coupled to the controller 50. The operator interface 52 is configured to present data from the vehicle 10 and/or the agricultural implement to an operator (e.g., data associated with operation of the vehicle 10, data associated with operation of the agricultural implement, a position of the vehicle 10, a speed of the vehicle 10, the desired path 22, the virtual paths, the target position 20, the current position 18, etc.) via a display 72. The operator interface 52 may also be configured to enable an operator to control certain functions of the vehicle 10 (e.g., starting and stopping the vehicle 10, inputting the desired path 22, etc.). In some embodiments, the operator interface 52 may enable the operator to input parameters that cause the controller 50 to adjust the virtual paths. For example, the operator may provide an input requesting that the desired path be acquired as quickly as possible, that the speed of the vehicle 10 remain within certain limits, or the like. In addition, the operator interface 52 (e.g., via the display 72, via an audio system, etc.) may be configured to alert an operator if the desired path 22 cannot be achieved, for example.

It should be appreciated that in certain embodiments, the control system 40 may include a base station 74 having a base station controller 76 located remotely from the vehicle 10. For example, in certain embodiments, control functions of the control system 40 may be distributed between the controller 50 of the off-road vehicle control system 40 and the base station controller 76. In certain embodiments, the base station controller 68 may perform a substantial portion of the control functions of the control system 40. For example, in certain embodiments, a first transceiver 78 positioned on the vehicle 10 may output signals indicative of vehicle characteristics (e.g., the speed, maximum turning rate, minimum turning radius, steering angle, roll, pitch, rotational rates, acceleration, or any combination thereof), the position, and/or the heading of the vehicle 10 to a second transceiver 80 at the base station 74. In such embodiments, the base station controller 76 may iteratively calculate virtual paths and output control signals to control the steering control system 44, the speed control system 46, and/or the implement control system 48 to direct the vehicle 10 toward the desired path 22, for example. The base station control 76 may have a processor 82 and memory device 84 having all or some of the features and/or capabilities of the processor 54 and the memory device 56 discussed above. In some embodiments, the base station 32 may include an operator interface 86 having a display 88, which may have all or some of the features and/or capabilities of the operator interface 52 and the display 72 discussed above.

Figure 3:
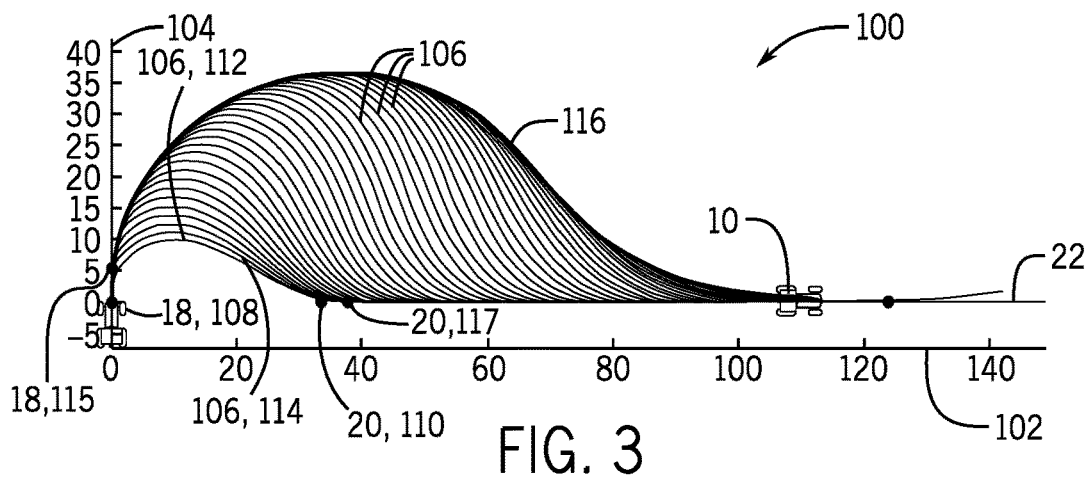
FIG. 3 is a graph of the vehicle of FIG. 1 acquiring a desired path at a relatively high speed, in accordance with an embodiment.

With the foregoing in mind, FIG. 3 is a graph 100 of the vehicle 10 traveling at a relatively high speed (e.g., 10 meters/second) and acquiring the desired path 22 based on multiple iteratively calculated virtual paths 106 in accordance with an embodiment. The x-axis 102 represents the x coordinate in meters, and the y-axis 104 represents the y coordinate in meters. During operation, the controller 50 may receive a signal indicative of the current position 18 (e.g., $x_0$ and $y_0$), the current heading (e.g., $q_0$), and/or the vehicle characteristics (e.g., current speed, turning radius limits, steering angle limits, steering angle rate limits, steering angle, roll, pitch, rotational rates, acceleration, or any combination thereof) of the vehicle 10 from the spatial locating device 42 or other components of the system as the vehicle 10 travels across a surface. In the illustrated example, the current position 18, 108 at a first time (e.g., at $t_1$) of the vehicle 10 is approximately defined by $x_0=0$ meters, $y_0=0$ meters, and $q_0=\pi/2$ radians. As shown, the vehicle 10 is rotated 90 degrees from the desired or target heading, $q_t$. In some embodiments, the controller 50 may also receive a signal indicative of the desired path 22 (e.g., input or selected by an operator via the operator interface 52 or accessed from a map stored in the memory device 56). In such cases, the controller 50 may be configured to determine a respective target position 20 (e.g., $x_t$, $y_t$, and $q_t$) of the vehicle 10 based at least in part on the desired path 22. For example, the controller 50 may determine the target position 20 by identifying a point on the desired path 22 that is closest to the current position 18 of the vehicle 10, and then projecting (e.g., adjusting the point) forward (e.g., in the direction of the target heading $q_t$) along the desired path 22 based on characteristics (e.g., speed, steering angle, turning rate limits, turning radius limits, roll, pitch, rotational rates, acceleration, or a combination thereof) of the vehicle 10. In the illustrated embodiment, the target position 20, 110 at the first time (e.g., at $t_1$) is located at approximately $x_t=35$ meters, $y_t=0$ meters with the target heading of $q_t=0$ radians.

The controller 50 may determine a first virtual path 106, 112 between the current position 18, 108 and the target position 20, 110. The controller 50 does not attempt to guide the vehicle 10 along the entirety of the first virtual path 106, 112 from the current position 18, 108 to the target position 20, 110. Rather, the controller 50 outputs a control signal indicative of an initial curvature (e.g., a first value of the curvature) of the first virtual path 106, 112 to adjust the steering angle of the vehicle 10 (e.g., via the steering control system 44). Because of vehicle limitations and dynamics, the steering angle may not immediately achieve this commanded value. Thus, the virtual path will not be followed and is subsequently ignored in favor of a recalculated virtual path. In some embodiments, the control signal output by the controller 50 may additionally or alternatively control the speed control system 46 and/or the implement control system 48 to adjust the speed of the vehicle 10 and/or adjust the implement during the automated steering process (e.g., to increase the minimum turning radius, block the vehicle 10 from exceeding certain speed, raise or turn off the implement, or the like).

The controller 50 iteratively calculates virtual paths 106 as the vehicle 10 travels across the surface. For example, the controller 50 may determine the first virtual path 106, 112, output a signal based on the initial curvature of the first virtual path 106, 112, and control the various systems 46, 48, 50 to guide the vehicle 10 according the initial curvature of the first virtual path 106, 112. The controller 50 may thereafter determine a second virtual path 106, 114 between the current position 18 (e.g., an updated current position 18, 115 at a second time, $t_2$) and the target position 20 (e.g., an updated target position 20, 117 at the second time, $t_2$). The controller 50 may then output a signal based on the initial curvature of the second virtual path 106, 114, and control the various systems 46, 48, 50 to guide the vehicle 10 according to the initial curvature of the second virtual path 106, 114. The controller 50 may iteratively calculate multiple virtual paths 106 (e.g., more than 10, 20, 30, 40, 50, 100, 500, 1000) in this manner. In the illustrated example, a travel path 116 is the path that the vehicle 10 travels along to move from the current position 18, 108 to the desired path 22. The travel path 116 is distinct from the virtual paths 106 and is created as the vehicle 10 is driven based on the initial curvatures of the iteratively calculated virtual paths 106.

The controller 50 outputs a single curvature command (corresponding to the initial curvature) for each iteratively calculated virtual path 106. In some embodiments, the controller 50 may iteratively calculate virtual paths 106 at intervals less than or equal to approximately 0.01, 0.02, 0.03, 0.04, 0.05, or 0.1 seconds. In some embodiments, the controller 50 considers (e.g., uses as inputs into the algorithm) certain characteristics (e.g., speed, steering angle, turning rate limits, turning radius limits, roll, pitch, rotational rates, acceleration, or any combination thereof) when calculating the target position 20, and then does not consider such characteristics when calculating the virtual paths 106. In other embodiments, certain characteristics (e.g., speed) are considered in calculating both the target position 20 and the virtual paths 106, or some characteristics (e.g., minimum turning radius and maximum turning rate) are considered in calculating the target position 20 and other characteristics are considered in calculating the virtual paths 106. In some embodiments, the operator may input parameters (e.g., speed constraints, time constraints, or the like) that adjust the target position 20 and/or the virtual paths 106.

As noted above, the controller 50 may iteratively calculate the target position 20 (e.g., $x_1$, $y_1$, and $q_1$) as the vehicle 10 travels across the surface. For example, the controller 50 may iteratively calculate the target position 20 by identifying the point on the desired path 22 that is closest to the current position 18 of the vehicle 10, and then projecting (e.g., adjusting the point) forward (e.g., in the direction of the final heading $q_1$) along the desired path 22 based on characteristics (e.g., speed, steering angle, turning rate limits, turning radius limits, roll, pitch, rotational rates, and/or acceleration) of the vehicle 10. Thus, the controller 50 may advantageously adapt to changes in speed and/or other factors (e.g., steering angle, roll, pitch, rotational rates, and/or acceleration) as the vehicle 10 travels across the surface. Furthermore, the disclosed system may be a feedforward only system. Thus gains do not need to be set and the system does not utilize feedback to adjust its control signals based on the response of the vehicle 10 to the control signals.

As noted above, in some embodiments, the virtual paths 106 may be continuous to the second derivative of position ("C2 continuous"). For example, the virtual paths 106 may be clothoid paths or have single clothoid segments, as shown. A clothoid may be defined as a curve having a curvature that varies linearly with curve length. The velocity ($\dot{x}(s)$, $\dot{y}(s)$) at a distance s along the clothoid, may be described by the following equations:

$$\dot{x}(s) = \cos\left(\frac{\sigma}{2}s^2 + \kappa_0 s + q_0\right) \quad (1)$$

$$\dot{y}(s) = \sin\left(\frac{\sigma}{2}s^2 + \kappa_0 s + q_0\right) \quad (2)$$

where $q_0$ is the initial heading, $k_0$ is the initial curvature, and $\sigma$ is the rate of change of the curvature with respect to s, the distance along the clothoid. The curvature as a function of s may be described by:

$$\kappa = \sigma s + \kappa_0. \quad (3)$$

The heading as a function of s may be described by:

$$q = \frac{\sigma}{2}s^2 + \kappa_0 s + q_0 \quad (4)$$

Thus, the position (x(s), y(s)) may be described by:

$$x(s) = x_0 + \int_0^s \cos\left(\frac{\sigma}{2}\tau^2 + \kappa_0 \tau + q_0\right)d\tau, \text{ and} \quad (5)$$

$$y(s) = y_0 + \int_0^s \sin\left(\frac{\sigma}{2}\tau^2 + \kappa_0 \tau + q_0\right)d\tau \quad (6)$$

Thus, a clothoid is described by an initial position, $x_0$ and $y_0$, initial heading, $q_0$, initial curvature, $\kappa_0$, rate of curvature, $\sigma$, and path length, s. In some embodiments, the parameters of the clothoids may be adjusted and/or constrained based on characteristics of the vehicle 10. For example, a maximum turning rate of the vehicle may determine a maximum value for the rate of curvature $\sigma$ and a minimum turning radius may determine a minimum value for the curvature $\kappa$. Advantageously, the control signals generated based on the initial curvature of iteratively calculated clothoid paths may guide the vehicle 10 along a drivable path (e.g., a path that does not exceed the capabilities of the vehicle 10, such as path 116) toward the desired path 22.

In certain embodiments, using the steering angle limit (e.g., the maximum steering angle) and/or the steering rate limit (e.g., the maximum steering rate) as a constraint(s) in calculating the target position 20 and/or the virtual paths 106 may advantageously cause the iteratively calculated, multiple virtual paths 106 to be substantially similar to one another. In such cases, the controller 50 may be configured to determine and to display (e.g., on the display 72) a predicted path (e.g., substantially similar to the drivable path 116 shown in FIG. 3) along which the vehicle 10 will be driven to reach the desired path. The predicted path may be determined and displayed after calculating the first virtual path 106, 114 (or a few initial virtual paths) by estimating or assuming that the subsequent multiple virtual paths 106 will be substantially similar to the first virtual path 106, 114 (or the few initial virtual paths).

Figure 4:
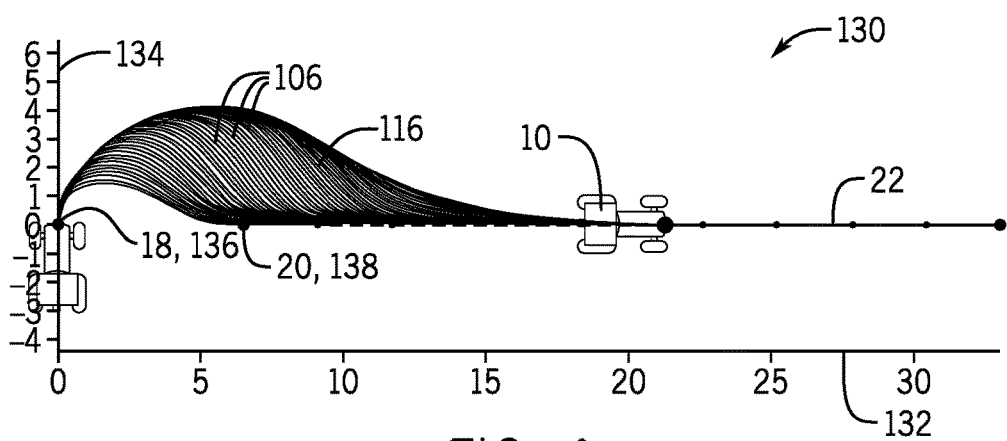
FIG. 4 is a graph of the vehicle of FIG. 1 acquiring the desired path at a relatively low speed, in accordance with an embodiment.

FIG. 4 is a graph 130 of the vehicle 10 traveling at a relatively low speed (e.g., as compared to FIG. 3, such as 1 meter/second) and acquiring the desired path 22 in accordance with another embodiment. The x-axis 132 represents the x coordinate in meters, and the y-axis 134 represents the y coordinate in meters. During operation, the controller 50 may receive a signal indicative of the current position 18 (e.g., $x_0$ and $y_0$), the current heading (e.g., $q_0$), and/or the characteristics of the vehicle 10 (e.g., current speed, turning radius limits, steering angle limits, steering angle rate limits, steering angle, roll, pitch, rotational rates, acceleration, or any combination thereof) from the spatial locating device 42 or other components of the system as the vehicle 10 travels across a surface. In the illustrated example, the current position 18, 136 at a first time (e.g., an initial position at $t_1$) of the vehicle 10 is approximately defined by $x_0=0$ meters, $y_0=0$ meters, and $q_0=\pi/2$ radians. In some embodiments, the controller 50 may also receive a signal indicative of the desired path 22. In such cases, the controller 50 may be configured to determine the target position 20 (e.g., $x_t$, $y_t$, and $q_t$) of the vehicle 10 based at least in part on the current position 18, the desired path 22, and/or characteristics (e.g., speed, steering angle, turning rate limits, turning radius limits, roll, pitch, rotational rates, and/or acceleration) of the vehicle 10. In the illustrated embodiment, the target position 20, 138 (e.g., at $t_1$) is located relatively close (e.g., as compared to the embodiment of FIG. 3) to the current position 18, 136 at least in part because the vehicle 10 is traveling at a relatively higher speed. For example, the target position 20 at the first time (e.g., at $t_1$) is located at approximately $x_t=5$ meters, $y_t=0$ meters, $q_t=0$ radians. In the manner discussed above with respect to FIG. 3, the controller 50 may iteratively calculate or update the current position 18, the target position 20, and/or the virtual paths 106 until the vehicle 10 acquires the desired path 22. In the illustrated example, the travel path 116 is the path that the vehicle 10 travels along to move from the current position 18, 136 to the desired path 22.

Figure 5:
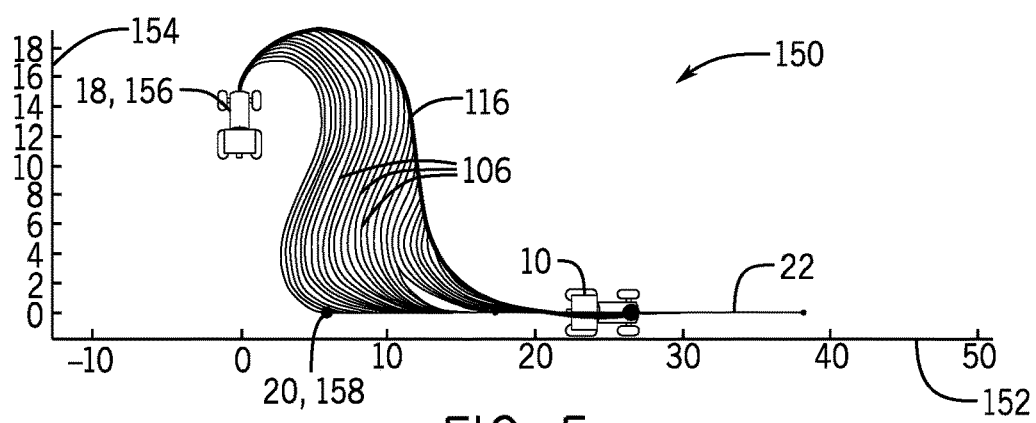
FIG. 5 is a graph of the vehicle of FIG. 1 acquiring the desired path from an offset position, in accordance with an embodiment.

FIG. 5 is a graph 150 of the vehicle 10 acquiring the desired path 22 in accordance with another embodiment. The x-axis 152 represents the x coordinate in meters, and the y-axis 154 represents the y coordinate in meters. During operation, the controller 50 may receive a signal indicative of the current position 18 (e.g., $x_0$ and $y_0$), the current heading (e.g., $q_0$), and/or vehicle characteristics (e.g., current speed, turning radius limits, steering angle limits, steering angle rate limits, steering angle, roll, pitch, rotational rates, acceleration, or any combination thereof) of the vehicle 10 from the spatial locating device 42 or other components of the system as the vehicle 10 travels across a surface. In the illustrated example, the current position 18, 156 at a first time (e.g., an initial position at $t_1$) of the vehicle 10 is approximately defined by $x_0=0$ meters, $y_0=15$ meters, and $q_0=\pi/2$ radians. In some embodiments, the controller 50 may also receive a signal indicative of the desired path 22. In the illustrated embodiment, the desired path 22 is offset from the current position 18, 156 along the y-axis 154. In such cases, the controller 50 may be configured to determine the target position 20 (e.g., $x_t$, $y_t$, and $q_t$) of the vehicle 10 based at least in part on the current position 18, the desired path 22, and/or on characteristics (e.g., speed, steering angle, turning rate limits, turning radius limits, roll, pitch, rotational rates, and/or acceleration) of the vehicle 10. As shown, the target position 20, 158 (e.g., at $t_1$) is located at approximately $x_t=5$ meters, $y_t=0$ meters, $q_t=0$ radians. In the manner discussed above with respect to FIG. 3, the controller 50 may iteratively calculate or updated the current position 18, the target position 20, and/or the virtual paths 106 until the vehicle 10 acquires the desired path. In the illustrated example, the travel path 116 is the path that the vehicle 10 travels along to move from the current position 18, 136 to the desired path 22.

In some embodiments, the current position 18 of the vehicle 10 relative to the desired path 22 may inhibit the vehicle 10 from acquiring or efficiently acquiring the desired path 22 via iteratively calculating a clothoid or other C2 continuous path in the manner set forth above. For example, if a distance between the current position 18 and the desired path 22 exceeds a threshold (e.g., a predetermined threshold stored in the memory device 56), a clothoid path may turn incorrectly or otherwise provide an inefficient path from the current position 18 to the desired path 22.

Figure 6:
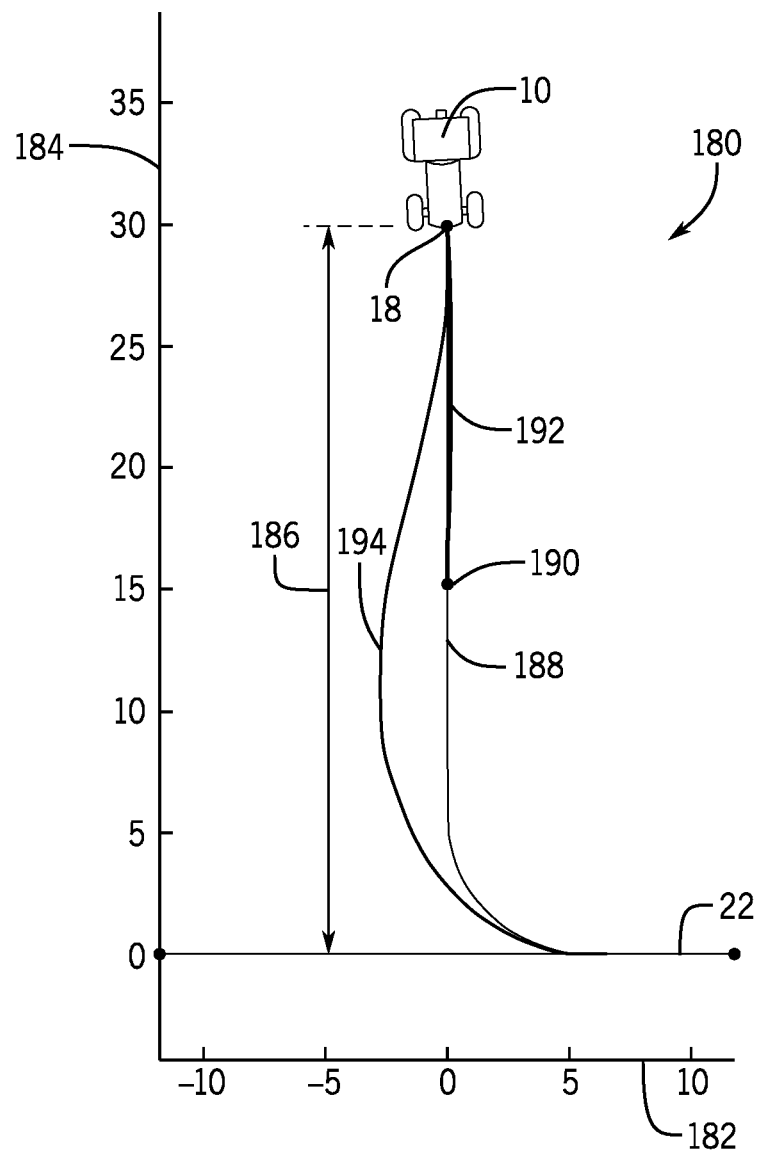
FIG. 6 is a graph of the vehicle of FIG. 1 located more than a threshold distance from the desired path, in accordance with an embodiment.

With the foregoing in mind, FIG. 6 is a graph 180 of the vehicle 10 acquiring the desired path 22 in accordance with another embodiment. The x-axis 182 represents the x coordinate in meters, and the y-axis 184 represents the y coordinate in meters. During operation, the controller 50 may receive a signal indicative of the current position 18 (e.g., $x_0$ and $y_0$), the current heading (e.g., $q_0$), and/or characteristics (e.g., current speed, turning radius limits, steering angle limits, steering angle rate limits, steering angle, roll, pitch, rotational rates, acceleration, or any combination thereof) of the vehicle 10 from the spatial locating device 42 or other components of the system as the vehicle 10 travels across a surface. In the illustrated example, the current position 18 at a first time (e.g., an initial position at $t_1$) of the vehicle 10 may be defined by approximately $x_0=0$ meters, $y_0=30$ meters, and $q_0=4.8$ radians. The controller 50 may also receive a signal indicative of the desired path 22. In the illustrated embodiment, the desired path 22 is located at $y_t=0$ and is offset from the current position 18 along the y-axis 184 by a distance 186 with the target heading, $q_t=0$ radians.

In operation, the controller 50 may determine the distance 186 between the current position 18 and the desired path 22. If the distance 186 exceeds the threshold, the controller 50 may calculate an alternate path 188 (e.g., a Dubins path) between the current position 18 and the desired path 22 and/or the target position 20. The controller 50 may then calculate an intermediate point 190 on the alternate path 188 (e.g., based on the current position, the alternate path 188, and/or characteristics of the vehicle 10) and calculate a virtual path 192 to the intermediate point 190. The controller 50 may then iteratively calculate the alternate path 188, the intermediate point 190 on the alternate path 188, and/or the virtual paths 192 to the intermediate point 190 as the vehicle 10 travels across a surface. In some embodiments, the controller 50 may iteratively calculate the alternate path 188, the intermediate point 190, and/or the virtual paths 192 until the distance 186 between the vehicle 10 and the desired path 22 is less than the threshold, and then the controller 50 may iteratively calculate the target position 20 on the desired path 22 and iteratively calculate virtual clothoid (or other C2 continuous) paths as discussed above with respect to FIG. 3 until the off-road vehicle acquires the desired path 22.

In some embodiments, the threshold may be equal to or greater than 1, 2, 3, 4, or 5 times a turning radius of the vehicle 10. In some embodiments, the alternate path 188 may be a Dubins path. A Dubins path may be defined as the shortest curve that connects two points in two-dimensional plane with a constraint on the curvature of the path and with prescribed initial and terminal tangents to the path. Typically, a Dubins path comprises a left or right turn arc ("R" or "L"), followed by a straight line ("S"), followed by another left or right turn arc ("R" or "L"). As noted above, the alternate path 188 may be utilized in certain embodiments where a clothoid curve 194 or iteratively calculated clothoid curves 194 do not provide an efficient or viable path for the vehicle 10 to reach the desired path 22.

Figure 7:
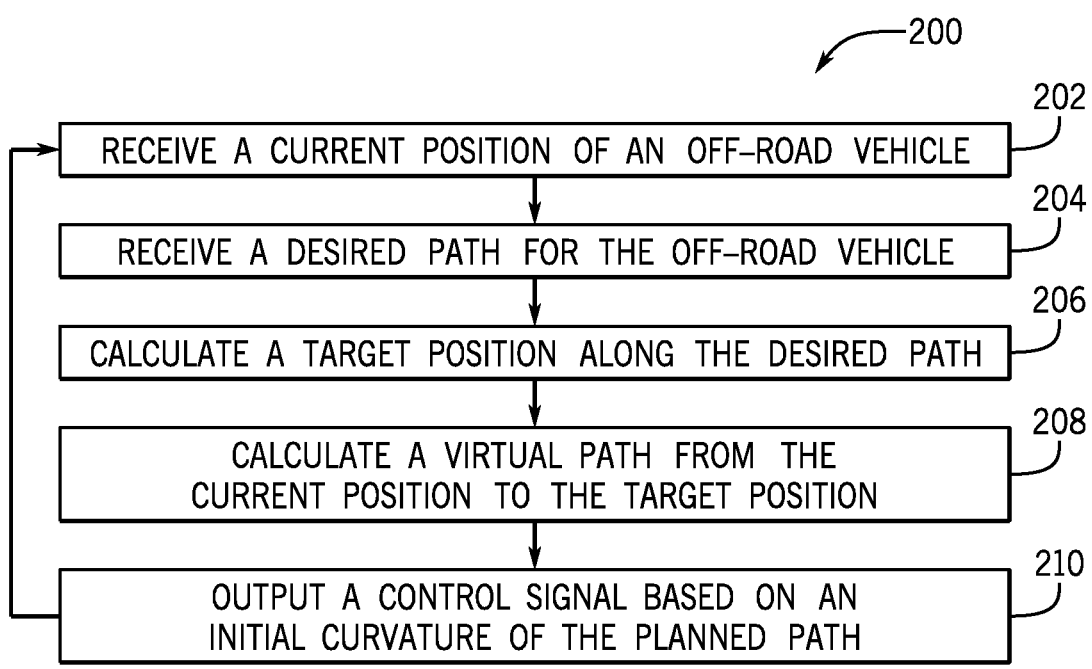
FIG. 7 is a flow chart of a method for iteratively calculating virtual paths and controlling a vehicle based on the virtual paths, in accordance with an embodiment.

FIG. 7 is a flow chart of an embodiment of a method 200 for iteratively calculating virtual paths and controlling the vehicle 10 based at least in part on the virtual paths. The methods disclosed herein include various steps represented by blocks. It should be noted that any of the methods provided herein, may be performed as an automated procedure by a system, such as the control system 40. Although the flow charts illustrate the steps in a certain sequence, it should be understood that the steps may be performed in any suitable order, certain steps may be omitted, and certain steps may be carried out simultaneously, where appropriate. Further, certain steps or portions of the methods may be performed by separate devices. For example, a first portion of the method may be performed by the off-road vehicle controller 50, while a second portion of the method may be performed by the base station controller 76.

In block 202, the controller 50 may receive a signal indicative of the current position 18 of the vehicle 10. In some embodiments, the controller 50 may receive the signal from the spatial locating device 42, and the current position 18 may include coordinates, $x_0$ and $y_0$, and a heading, go. In block 204, the controller 50 may receive a signal indicative of the desired path 22. The desired path 22 may be received from any suitable source, such as an operator via the operator interface 52 or from a map stored in the memory device 56. In block 206, the controller 50 may be configured to determine the target position 20 (e.g., $x_t$, $y_t$, and $q_t$) of the vehicle 10 along the desired path 22. In some embodiments, the controller 50 may determine the target position 20 by identifying a point on the desired path 22 that is closest to the current position 18 of the vehicle 10, and then projecting (e.g., adjusting the point) forward (e.g., in the direction of the target heading $q_t$) along the desired path 22 based on characteristics (e.g., speed, steering angle, turning rate limits, turning radius limits, roll, pitch, rotational rates, and/or acceleration) of the vehicle 10.

In step 208, the controller 50 may calculate a virtual path extending from the current position 18 to the target position 20. In certain embodiments, the virtual path may be a C2 continuous path, such as a clothoid path. In step 210, the controller 50 may output a control signal indicative of an initial curvature (e.g., a first value) of the virtual path to adjust a steering angle and/or other characteristics of the vehicle 10 (e.g., via the steering control system 44, the speed control system 46, and/or the implement control system 48). For example, a steering angle of the vehicle 10 may be adjusted to correspond to or substantially correspond to the initial curvature (e.g., be within or equal to 1, 2, 3, 4, or 5 percent of the initial curvature).

As discussed above, the controller 50 does not explicitly guide the vehicle 10 along the entirety of the virtual path from the current position 18 received at block 202 to the target position 20 calculated at block 206. Rather, steps 202 to 210 are repeated (e.g., the virtual path is iteratively calculated and the steering angle of the vehicle 10 adjusted) to enable the vehicle 10 to travel toward and/or along the desired path 22.

Figure 8:
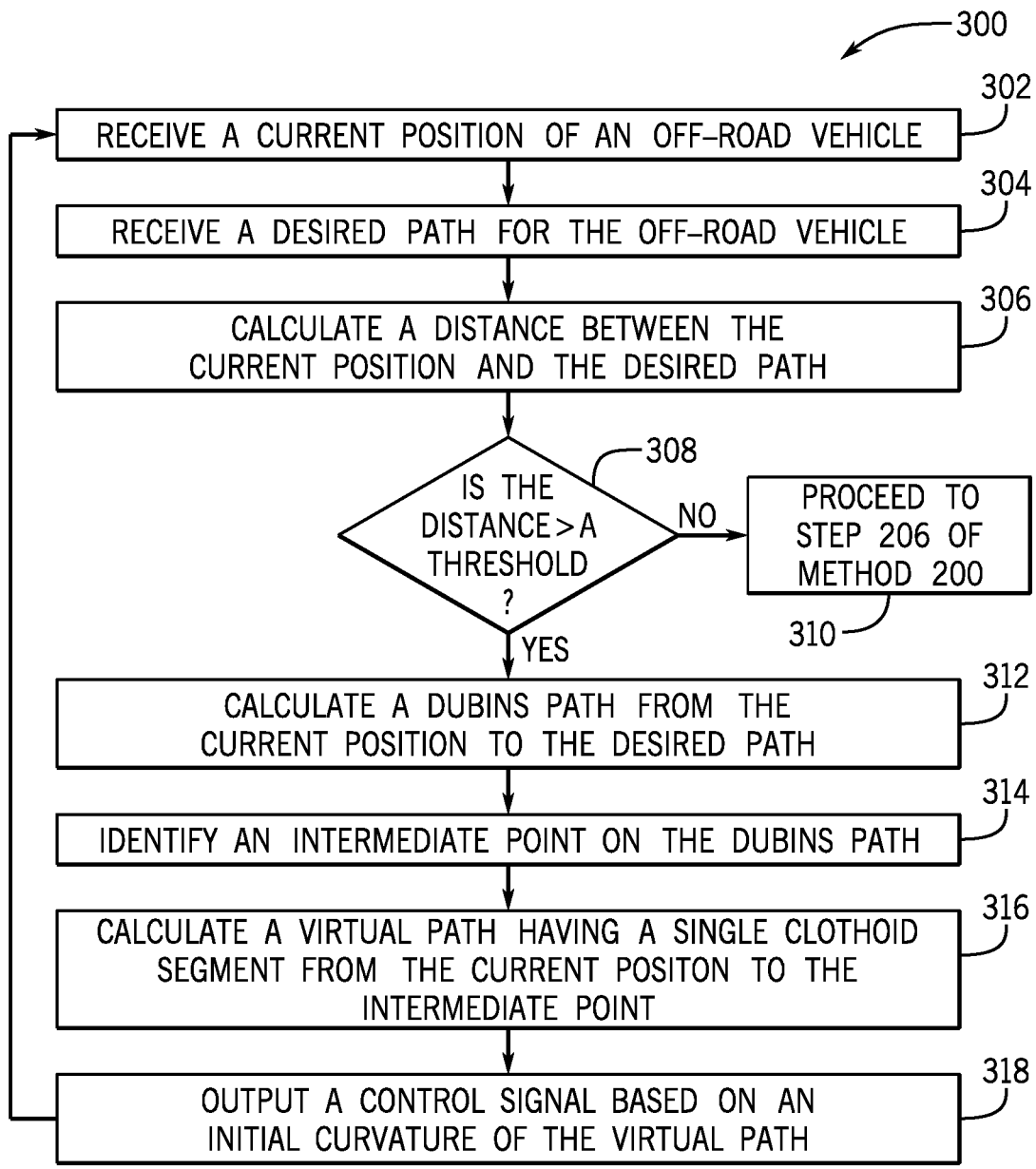
FIG. 8 is a flow chart of a method for iteratively calculating virtual paths and controlling a vehicle based on the virtual paths, in accordance with another embodiment.

FIG. 8 is a flow chart of an embodiment of a method 300 for iteratively calculating virtual paths and controlling the vehicle 10 based at least in part on the virtual paths. In block 302, the controller 50 may receive a signal indicative of the current position 18 of the vehicle 10. In some embodiments, the controller 50 may receive the signal from the spatial locating device 42, and the current position 18 may include coordinates, $x_0$ and $y_0$, and a heading, go. In block 304, the controller 50 may receive a signal indicative of the desired path 22. The desired path 22 may be received from any suitable source, such as an operator via the operator interface 52 or from a map stored in the memory device 56.

In step 306, the controller 50 may calculate a distance (e.g., distance 186) between the current position 18 and the desired path 22. At step 308, the controller 50 may determine whether the distance exceeds a threshold. In some embodiments, the threshold may be a predetermined threshold accessible by the controller 50 (e.g., from the memory device 56). In some embodiments, the threshold may be equal to or greater than 1, 2, 3, 4, or 5 times a turning radius of the vehicle 10. As shown in block 310, if the distance does not exceed the threshold, the method 300 may proceed to step 206 of the method 200 of FIG. 7. As shown in block 312, if the distance exceeds the threshold, the controller 50 may calculate an alternate path (e.g., a Dubins path or the alternate path 188) between the current position 18 and the desired path 22 and/or the target position 20. At block 314, the controller 50 may calculate an intermediate point (e.g., the intermediate point 190) on the alternate path. At block 316, the controller 50 may calculate a virtual path (e.g., the virtual path 192) to the intermediate point.

At block 318, the controller 50 may output a control signal indicative of an initial curvature (e.g., a first value) of the virtual path to adjust a steering angle of the vehicle 10 (e.g., via the steering control system 44, the speed control system 46, and/or the implement control system 48). For example, a steering angle of the vehicle 10 may be adjusted to correspond to or substantially correspond to the initial curvature (e.g., be within or equal to 1, 2, 3, 4, or 5 percent of the initial curvature).

As discussed above, the controller 50 does not guide the vehicle 10 along the entirety of the virtual path from the current position 18 received at block 202 to the intermediate point calculated at block 314. Rather, at block 320, the controller 50 may receive the current position 18 of the vehicle 10 (e.g., at a second time subsequent to block 302). The controller 50 may then iteratively calculate the distance, the alternate path, the intermediate point on the alternate path, and/or the virtual paths to the intermediate point as the vehicle 10 travels across a surface. In some embodiments, the controller 50 may iteratively calculate the distance, the alternative paths, the intermediate points, and/or the virtual paths until the distance between the vehicle 10 and the desired path 22 is less than the threshold, and then the controller 50 may proceed to step 206 of the method 200 set forth in FIG. 7 (e.g., to iteratively calculate the target position 20 on the desired path 22 and iteratively calculate virtual paths [e.g., clothoid or other C2 continuous]).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural vehicle guidance system, comprising:
a control system comprising a processor configured to receive a first signal indicative of a current position and a current heading of an agricultural vehicle, and a second signal indicative of a target path of the agricultural vehicle, wherein the processor is configured to determine a virtual path extending from the current position to a target position on the target path, wherein an initial heading of the virtual path extends along the current heading, and a terminal heading of the virtual path extends tangentially to the target path at the target position;
wherein the processor is configured to output a third signal indicative of a curvature command corresponding to an initial curvature of the virtual path to cause a steering control system of the agricultural vehicle to adjust a steering angle of the agricultural vehicle;
wherein the processor is subsequently configured to iteratively receive an updated current position and an updated current heading of the agricultural vehicle during travel of the vehicle towards the target path, determine an updated target position on the target path, determine an updated virtual path that extends from the updated current position to the updated target position, wherein an updated initial heading of the updated virtual path extends along the updated current heading, and an updated terminal heading of the updated virtual path extends tangentially to the target path at the updated target position; and wherein the processor is configured to output an updated curvature command corresponding to a respective initial curvature of the updated virtual path as the agricultural vehicle travels toward the target path;

wherein a driven travel path of the agricultural vehicle to the target path is based on the initial curvature of the virtual path and the initial curvature of the updated virtual path, wherein the travel plan is formed by a plurality of the iteratively updated initial curvatures.

2. The system of claim 1, wherein the virtual path comprises one or more clothoid segments, wherein the one or more clothoid segments are constrained based on a minimum turning radius of the agricultural vehicle, a maximum turning rate of the agricultural vehicle, or both.

3. The system of claim 1, wherein the virtual path commences from the current position of the agricultural vehicle and terminates at the target position on the target path.

4. The system of claim 1, wherein the processor is configured to receive a fourth signal indicative of an updated target path of the agricultural vehicle.

5. The system of claim 1, wherein the processor is configured to receive the first signal indicative of the current position and the current heading of the agricultural vehicle from a spatial locating device coupled to the agricultural vehicle, and the processor is configured to receive the second signal indicative of the target path of the agricultural vehicle from an operator interface.

6. The system of claim 1, wherein the processor is configured to determine the target position based on the target path, the current position, and a minimum turning radius of the agricultural vehicle, a maximum turning rate of the agricultural vehicle, a current speed of the agricultural vehicle, or a combination thereof.

7. The system of claim 1, wherein the processor is configured to iteratively determine additional virtual paths subsequent to determination of the updated virtual path, wherein the additional virtual paths are determined periodically during travel toward the target path.

8. The system of claim 1, wherein the processor is configured to determine a Dubins path between the current position and the target position upon a determination that a distance between the current position and the target path exceeds a threshold value.

9. The system of claim 8, wherein the processor is configured to monitor the distance between the current position and the target path, and the processor is configured to iteratively determine virtual clothoid paths between the current position and the target position upon a determination that the distance falls below the threshold value.

10. A non-transitory computer-readable medium having computer executable code stored thereon, the code comprising instructions to:
receive a first signal indicative of a current position and a current heading of an agricultural vehicle;
determine a virtual path between the current position and a target position on a target path of the agricultural vehicle, wherein an initial heading of the virtual path extends along the current heading of the agricultural vehicle, and a terminal heading of the virtual path extends tangentially to the target path at the target position;
output a second signal indicative of a curvature command corresponding to an initial curvature of the virtual path to adjust a steering angle of the agricultural vehicle;
iteratively receive a third signal indicative of updated current positions and updated current headings of the agricultural vehicle;
iteratively determine during travel of the agricultural vehicle toward the target path updated virtual paths from the updated current positions to updated target positions on the target path, wherein the updated virtual paths include updated initial headings respectively extending along the updated current headings, and updated terminal headings extending tangentially to the target path at respective ones of the updated target positions; and
output updated curvature commands corresponding to updated initial curvatures of the iteratively determined updated virtual paths as the agricultural vehicle travels to guide the agricultural vehicle toward the target path;
create a travel path as the agricultural vehicle is driven to the target path based on the initial curvature and the updated initial curvatures resulting of the updated virtual paths, wherein the travel path is distinct from the updated virtual paths.

11. The non-transitory computer-readable medium of claim 10, wherein the virtual path commences from the current position and terminates at the target position, and the updated virtual paths respectively commence from the updated current positions and respectively terminate at the updated target positions.

12. The non-transitory computer-readable medium of claim 10, wherein the virtual path comprises at least one clothoid segment.

13. The non-transitory computer-readable medium of claim 10, wherein the code comprises instructions to determine the target position based on a speed of the agricultural vehicle, an acceleration of the agricultural vehicle, a steering angle of the agricultural vehicle, a turning rate limit of the agricultural vehicle, or a combination thereof.

14. The non-transitory computer-readable medium of claim 10, wherein the code comprises instructions to:
determine a distance between the current position of the agricultural vehicle and the target path;
determine a Dubins path between the current position and the target position and iteratively determine an intermediate point on the Dubins path upon a determination that the distance exceeds a threshold value;
iteratively determine clothoid paths from the current position to the intermediate point while the distance exceeds the threshold value; and
iteratively determine additional clothoid paths from the current position to the target position upon a determination that the distance falls below the threshold value.

15. A method of controlling an agricultural vehicle, comprising:
using a processor to:
receive a first signal indicative of a current position and a current heading of an agricultural vehicle;
receive a second signal indicative of a target path of the agricultural vehicle;
calculate a virtual path commencing from the current position and terminating at a target position on the target path, wherein an initial heading of the virtual path extends along the current heading, and a terminal heading of the virtual path extends tangentially to the target path at the target position;

output a third signal indicative of a curvature command corresponding to an initial curvature of the virtual path to cause a steering control system of the agricultural vehicle to adjust a steering angle of the agricultural vehicle;

iteratively calculate updated virtual paths commencing from updated current positions of the agricultural vehicle and terminating at updated target positions on the target path, wherein respective initial headings of the updated virtual paths extend along updated current headings of the agricultural vehicle, and respective terminal headings of the virtual paths extend tangentially to the target path at the updated target positions; and output updated curvature commands corresponding to initial curvatures of the updated virtual paths as the agricultural vehicle travels toward the target path;

create a travel path to the target path as the agricultural vehicle is driven based on the initial curvatures of the iteratively calculated updated virtual-paths, wherein the travel path is distinct from the updated virtual path.

16. The method of claim 15, comprising iteratively calculating the updated virtual paths and outputting the updated curvature commands at regular intervals to cause the agricultural vehicle to travel along a travel path that is distinct from any of the updated virtual paths.

17. The method of claim 16, wherein the updated virtual paths are determined after lapse of a time interval, and the time interval is between 0.01 seconds and 0.1 seconds.

18. The method of claim 15, comprising using the processor to receive the target path and any updates to the target path via an operator interface that is configured to receive an input from an operator of the agricultural vehicle.

19. The method of claim 15, wherein the virtual path, the updated virtual paths, or both, comprise one or more clothoid segments.

20. The method of claim 15, comprising using the processor to determine the target position on the target path based on an acceleration of the agricultural vehicle, a steering angle of the agricultural vehicle, a turning rate limit of the agricultural vehicle, or a combination thereof.

* * * * *